US011188265B2

(12) United States Patent
Hsu et al.

(10) Patent No.: US 11,188,265 B2
(45) Date of Patent: *Nov. 30, 2021

(54) METHOD FOR PERFORMING STORAGE SPACE MANAGEMENT, ASSOCIATED DATA STORAGE DEVICE, AND CONTROLLER THEREOF

(71) Applicant: Silicon Motion, Inc., Hsinchu County (TW)

(72) Inventors: Sheng-I Hsu, Hsinchu County (TW); Ching-Chin Chang, Hsinchu County (TW)

(73) Assignee: Silicon Motion, Inc., Hsinchu County (TW)

(*) Notice: Subject to any disclaimer, the term of this patent is extended or adjusted under 35 U.S.C. 154(b) by 100 days.

This patent is subject to a terminal disclaimer.

(21) Appl. No.: 16/852,526

(22) Filed: Apr. 19, 2020

(65) Prior Publication Data
US 2020/0249873 A1    Aug. 6, 2020

Related U.S. Application Data

(63) Continuation of application No. 16/271,899, filed on Feb. 11, 2019, now Pat. No. 10,671,322.

(30) Foreign Application Priority Data

Nov. 16, 2018    (TW) .................... 107140730

(51) Int. Cl.
*G06F 12/00* (2006.01)
*G06F 3/06* (2006.01)
*G06F 12/10* (2016.01)

(52) U.S. Cl.
CPC .......... *G06F 3/0659* (2013.01); *G06F 3/0604* (2013.01); *G06F 3/0679* (2013.01);
(Continued)

(58) Field of Classification Search
None
See application file for complete search history.

(56) References Cited

U.S. PATENT DOCUMENTS 8,078,797 B2    12/2011   Estakhri
9,575,882 B2    2/2017    Nellans
(Continued)

FOREIGN PATENT DOCUMENTS

CN    108628762 A    10/2018
TW     I622890 B     5/2018

*Primary Examiner* — Jason W Blust
(74) *Attorney, Agent, or Firm* — Winston Hsu

(57) ABSTRACT

A method for performing storage space management, an associated data storage device, and a controller thereof are provided. The method includes: receiving an identify controller command from a host device; in response to the identify controller command, returning a reply to the host device to indicate that a plurality of logical block address (LBA) formats are supported, where the plurality of LBA formats are related to access of a non-volatile (NV) memory, and the plurality of LBA formats include a first LBA format and a second LBA format; receiving a first namespace (NS) management command from the host device; in response to the first NS management command, establishing a first NS adopting the first LBA format; receiving a second NS management command from the host device; and in response to the second NS management command, establishing a second NS adopting the second LBA format.

20 Claims, 4 Drawing Sheets

(52) U.S. Cl.
CPC ...... *G06F 12/10* (2013.01); *G06F 2212/1044* (2013.01); *G06F 2212/657* (2013.01)

(56) References Cited

U.S. PATENT DOCUMENTS

2015/0378629 A1 12/2015 Suzuki
2019/0332298 A1 10/2019 Madabhushi

METHOD FOR PERFORMING STORAGE SPACE MANAGEMENT, ASSOCIATED DATA STORAGE DEVICE, AND CONTROLLER THEREOF

CROSS REFERENCE TO RELATED APPLICATIONS

This application is a continuation application and claims the benefit of U.S. Non-provisional application Ser. No. 16/271,899, which was filed on Feb. 11, 2019, and is included herein by reference.

BACKGROUND OF THE INVENTION

1. Field of the Invention

The present invention is related to access of a flash memory, and more particularly, to a method for performing storage space management, an associated data storage device, and a controller thereof.

2. Description of the Prior Art

Developments in memory technology have led to the wide application of portable or non-portable data storage devices, such as a memory card conforming to the SD/MMC, CF, MS, XD or UFS specifications, or an embedded storage device conforming to the UFS or EMMC specifications. NAND flash memories may comprise single level cell (SLC) and multiple level cell (MLC) flash memories. New data storage device products may utilize triple level cell (TLC) flash memories, or even quadruple level cell (QLC) flash memories. To ensure that access control of a flash memory in a data storage device meets related specifications, a controller of the flash memory is usually configured to have management mechanisms to properly control internal operations thereof.

Related art data storage devices with the above management mechanisms still have some disadvantages. For example, a host device in a conventional mode may access a data storage device in units of a certain size such as 0.5 kilobytes (KB), and the management mechanisms might perform internal management of the data storage device in units of another size such as 4 KB. An existing design within the data storage device may make the data storage device be compatible with the host device in the conventional mode. Regarding a 4-KB native mode of a new host device, there is no feasible solution scheme to make the data storage device be compatible with the 4-KB native mode. As a result, a hardware architecture of the data storage device has to be changed, potentially requiring development for additional integrated circuits, which may greatly increase related costs (such as material costs and labor costs). Thus, there is a need for a novel method and associated architecture, to implement a data storage device compatible with the 4-KB native mode without introducing any side effect or in a way that is less likely to introduce side effects.

SUMMARY OF THE INVENTION

An objective of the present invention is to provide a method for performing storage space management, an associated data storage device, and a controller thereof, to solve the aforementioned problems.

Another objective of the present invention is to provide a method for performing storage space management, an associated data storage device, and a controller thereof, to optimize performance of a data storage device without introducing any side effect or in a way that is less likely to introduce side effects.

At least one embodiment of the present invention provides a method for performing storage space management, wherein the method is applied to a data storage device. The data storage device comprises a non-volatile (NV) memory, and the NV memory comprises at least one NV memory element. The method may comprise: receiving an identify controller command from a host device; in response to the identify controller command, returning a reply to the host device, to indicate that a plurality of logical block address (LBA) formats are supported, wherein the plurality of LBA formats are related to access of the NV memory, and the plurality of LBA formats comprise a first LBA format and a second LBA format; receiving a first namespace (NS) management command from the host device; in response to the first NS management command, establishing a first NS adopting the first LBA format; receiving a second NS management command from the host device; and in response to the second NS management command, establishing a second NS adopting the second LBA format.

At least one embodiment of the present invention provides a data storage device, which may comprise: an NV memory, arranged to store information, wherein the NV memory comprises at least one NV memory element; and a controller, coupled to the NV memory, arranged to control operations of the data storage device. The controller may comprise a processing circuit, and the processing circuit may control the controller according to a plurality of host commands from a host device, to allow the host device to control access to the NV memory through the controller. For example, the controller receives an identify controller command from the host device; in response to the identify controller command, the controller returns a reply to the host device, to indicate that a plurality of LBA formats are supported, wherein the plurality of LBA formats are related to access of the NV memory, and the plurality of LBA formats comprise a first LBA format and a second LBA format; the controller receives a first NS management command from the host device; in response to the first NS management command, the controller establishes a first NS adopting the first LBA format; the controller receives a second NS management command from the host device; and in response to the second NS management command, the controller establishes a second NS adopting the second LBA format.

At least one embodiment of the present invention provides a controller of a data storage device, wherein the data storage device comprises the controller and an NV memory, and the NV memory comprises at least one NV memory element. The controller may comprise a processing circuit, and the processing circuit may control the controller according to a plurality of host commands from a host device, to allow the host device to control access to the NV memory through the controller. For example, the controller receives an identify controller command from the host device; in response to the identify controller command, the controller returns a reply to the host device, to indicate that a plurality of LBA formats are supported, wherein the plurality of LBA formats are related to access of the NV memory, and the plurality of LBA formats comprise a first LBA format and a second LBA format; the controller receives a first NS management command from the host device; in response to the first NS management command, the controller establishes a first NS adopting the first LBA format; the controller receives a second NS management command from the host device; and in response to the second NS management command, the controller establishes a second NS adopting the second LBA format.

Through dynamic storage space management, the present invention can properly control operations of the controller, and more particularly, can access an NV memory in response to various requirements of users (e.g. the aforementioned conventional mode or the aforementioned 4-KB native mode) under a condition of utilizing the same hardware architecture. In addition, implementation of the present invention will not greatly increase costs. Thus, the related art problems can be solved without greatly increasing costs. In comparison with the related art, the present invention can achieve optimal performance of a data storage device without introducing any side effector in away that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
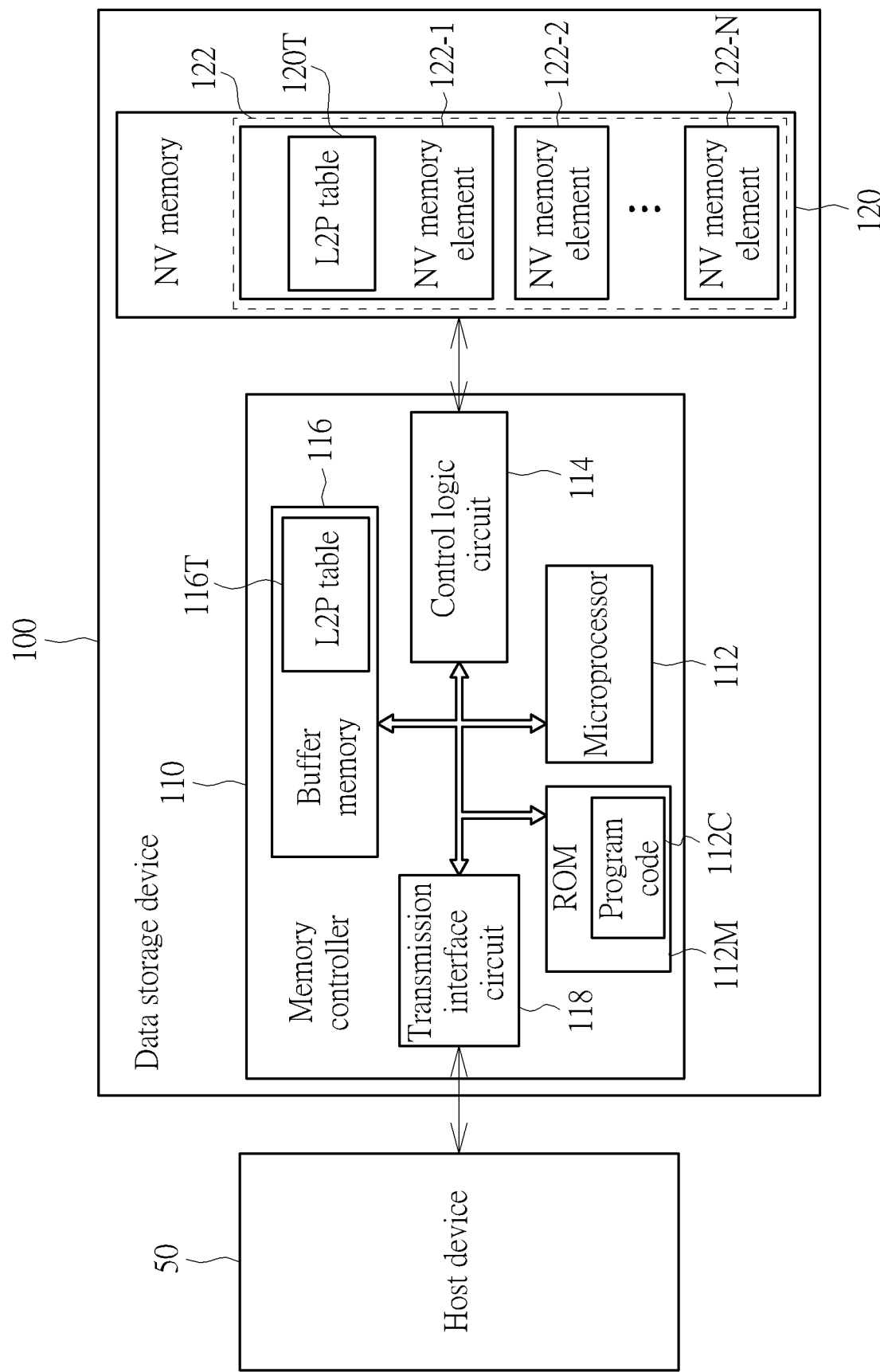
FIG. 1 is a diagram illustrating a data storage device and a host device according to an embodiment of the present invention.

FIG. 1 is a diagram illustrating a data storage device 100 and a host device 50 according to a first embodiment of the present invention. The data storage device 100 may be a solid state drive (SSD). In addition, examples of the host device 50 may include, but are not limited to: a multifunctional mobile phone, a tablet, and a personal computer such as a desktop computer and a laptop computer. According to this embodiment, the data storage device 100 may comprise a controller such as a memory controller 110, and may further comprise a non-volatile (NV) memory 120, where the controller is arranged to access the NV memory 120, and the NV memory 120 is arranged to store information. The NV memory 120 may comprise a plurality of NV memory elements 122-1, 122-2, . . . and 122-N, where N is a positive integer greater than one. For example, the NV memory 120 may be a flash memory, and the NV memory elements 122-1, 122-2, . . . and 122-N may be a plurality of flash memory chips or a plurality of flash memory dies, but the present invention is not limited thereto. In addition, the data storage device 100 may further comprise one or more volatile memory elements (which may be collectively referred to as the volatile memory element for brevity) to buffer or cache data, where the volatile memory element is preferably a dynamic random access memory (DRAM).

As shown in FIG. 1, the memory controller 110 may comprise a processing circuit such as a microprocessor 112, a storage device such as a read only memory (ROM) 112M, a control logic circuit 114, a buffer memory 116, and a transmission interface circuit 118, where these components may be coupled to each other through a bus. The buffer memory 116 is implemented by a random access memory (RAM), which is preferably a static RAM (SRAM). The memory controller 110 may take the buffer memory 116 as a first external cache, and take the volatile memory element as a second external cache, where a data storage amount of the volatile memory element is preferably greater than a data storage amount of the buffer memory 116, and data buffered or cached in the volatile memory element is preferably from the buffer memory 116.

The ROM 112M in this embodiment is arranged to store a program code 112C, and the microprocessor 112 is arranged to execute the program code 112C to control access to the NV memory 120. Please note that the program code 112C may also be stored in the buffer memory 116 or any type of memory. Additionally, the control logic circuit 114 may comprise an error correction code (ECC) circuit, to protect data and/or perform error correction. The transmission circuit 118 may conform to a specific communications specification (such as the Serial Advanced Technology Attachment (SATA) specification, the Peripheral Component Interconnect Express (PCIE) specification or the Non-Volatile Memory Express (NVME) specification) and may perform communications according to the specific communications specification.

In this embodiment, the host device 50 may transmit a plurality of host commands and corresponding logical addresses to the memory controller 110, to indirectly access the NV memory 120 within the data storage device 100. The memory controller 110 receives the plurality of host commands and the logical addresses, and translates the plurality of host commands into memory operating commands (referred to as operating commands for brevity). The memory controller 110 may read, write and/or program memory units or pages of specific physical addresses within the NV memory 120 according to the operating commands, where the physical addresses correspond to the physical addresses.

In addition, the memory controller 110 may store and update at least one logical-to-physical (L2P) address mapping table (referred to as L2P table for brevity), such as an L2P table 116T within the buffer memory 116 and an L2P table 120T within the NV memory 120, to manage mapping relationships between the physical addresses and the logical addresses for performing access control. For example, the L2P table 120T may comprise all mapping information of the mapping relationships.

In addition, the L2P table 120T may be divided into groups, and the memory controller 110 may load one or all of the groups into the buffer memory 116 according to a capacity of the buffer memory 116, to be the L2P table 116T for quick reference, but the present invention is not limited thereto. When updating user data, the memory controller 110 may update the L2P table 116T and/or the L2P table 120T according to the latest mapping relationship of the user data. For better comprehension, the L2P table 120T may be stored in the NV memory element 122-1, but the present invention is not limited thereto.

The memory controller 110 may store the L2P table 120T into any NV memory element within the NV memory 120, such as any NV memory element 122-*n* of the NV memory elements 122-1, 122-2, . . . and 122-N (e.g. "n" may represent any integer within the interval [1, N]), where a size of one group of the groups of the L2P table 120T is preferably equal to a size of one page of the NV memory element 122-*n* (e.g. 16 KB). In another example, the size of one group of the groups of the L2P table 120T may be equal to a size of one page of multiple NV memory elements 122, such as in a situation where N=4, a size of one page of four NV memory elements 122, i.e. 64 KB, and the page of these four NV memory elements 122 may be referred to as a super page.

Additionally, the memory controller 110 may determine formats of the L2P tables 116T and 120T according to different configurations. For example, based on a first configuration, a size of a logical block is 0.5 KB, and the memory controller 110 may generate the L2P tables 116T and 120T corresponding to a first logical block address (LBA) format. In another example, based on a second configuration, the size of a logical block is 4 KB, and the memory controller 110 may generate the L2P tables 116T and 120T corresponding to a second LBA format. Thus, the data storage device 100 (more particularly, the memory controller 110 and the microprocessor 112 therein) can correctly access the NV memory 120 in response to settings of various configurations under a condition of utilizing the same hardware architecture.

Figure 2:
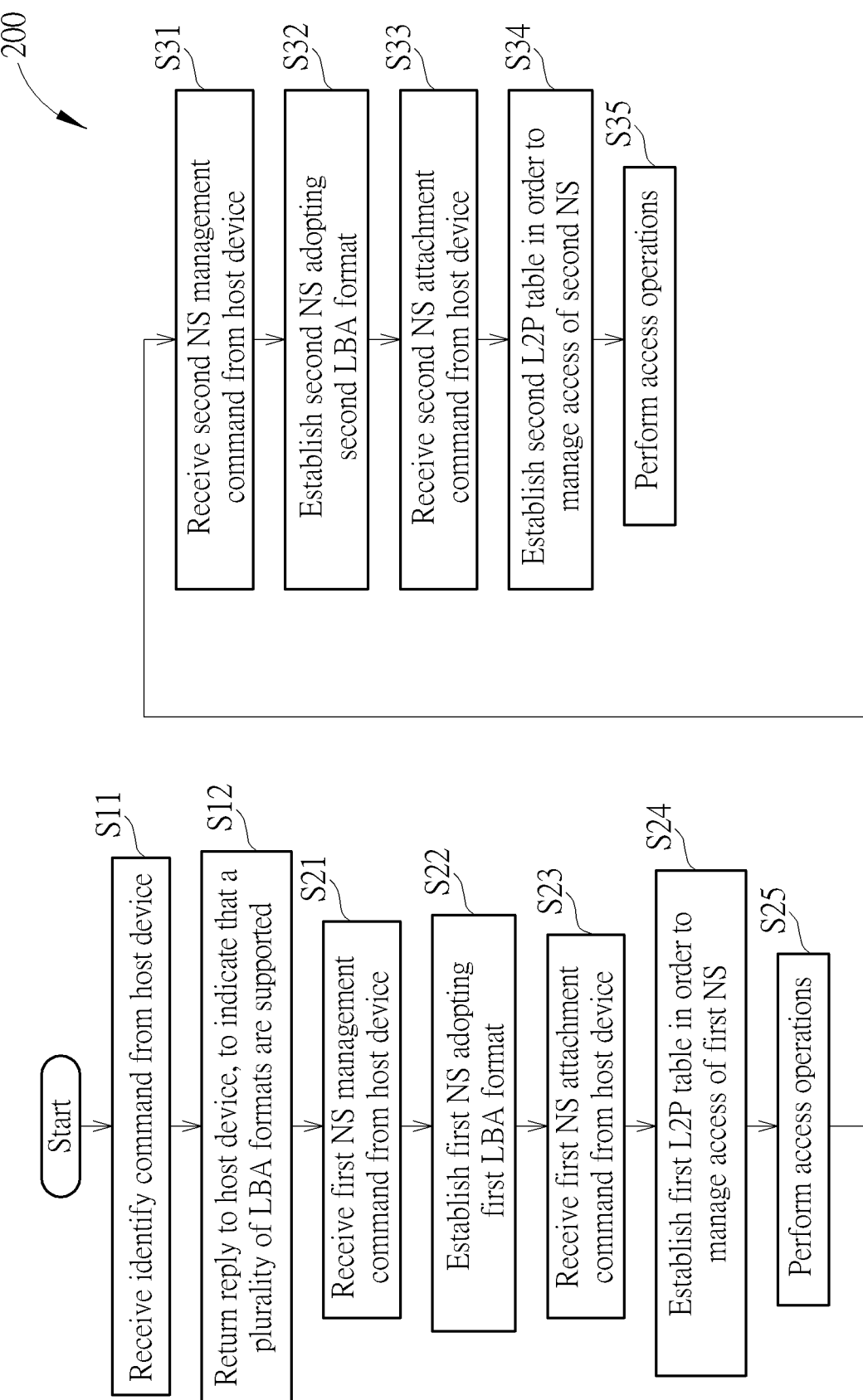
FIG. 2 is a working flow illustrating a method for performing storage space management according to an embodiment of the present invention.

FIG. 2 is a working flow 200 illustrating a method for performing storage space management according to an embodiment of the present invention. For example, under control of the processing circuit such as the microprocessor 112, the controller such as the memory controller 110 may perform operations of the working flow 200. For better comprehension, a first namespace (NS) and a second NS in the working flow 200 are respectively referred to as NSs NS #1 and NS #2, and corresponding first L2P table and second L2P table are respectively referred to as L2P tables L2P #1 and L2P #2.

In Step S11, the memory controller 110 receives an identify command, such as an identify controller command conforming to the NVME specification, from the host device 50. The memory controller 110 and the host device 50 may directly communicate with each other through commands conforming to the NVME specification. In another example, the memory controller 110 and the host device 50 may transmit or receive the commands conforming to the NVME specification through commands conforming to other specifications in order to communicate with each other.

In Step S12, in response to the identify controller command, the memory controller 110 returns a reply to the host device 50, to indicate that a plurality of LBA formats are supported, where each LBA format within the plurality of LBA formats may be arranged to determine a data amount indicated by a logical block (more particularly, each logical block) within a certain NS (e.g. one of the NSs NS #1 and NS #2). According to this embodiment, the plurality of LBA formats may comprise the first LBA format and the second LBA format, where an example of the first LBA format may be a 0.5-KB LBA format (a size of each logical block thereof is 0.5 KB), and an example of the second LBA format may be a 4-KB LBA format (a size of each logical block thereof is 4 KB).

In Step S21, the memory controller 110 receives a first NS management command from the host device 50.

In Step S22, in response to the first NS management command, the memory controller 110 establishes the NS NS #1 adopting the first LBA format.

In Step S23, the memory controller 110 receives a first NS attachment command from the host device 50.

In Step S24, in response to the first NS attachment command, the memory controller 110 establishes an L2P table L2P #1 (which may be an example of the L2P table 120T) in order to manage access of the NS NS #1.

In Step S25, the memory controller 110 performs one or more access operations such as a write operation and a read operation. According to this embodiment, in response to a first write command from the host device 50, the memory controller 110 may write first data into the NS NS #1 (e.g. a logical address LBA #(x1) therein), and correspondingly update the L2P table L2P #1 to indicate a mapping relationship between at least one logical address (e.g. the logical address LBA #(x1)) and the first data. In response to a first read command from the host device 50, the memory controller 110 may read the first data from the NS NS #1 according to the L2P table L2P #1 (e.g. the mapping relationship therein). Step S25 is a non-essential step.

In Step S31, the memory controller 110 receives a second NS management command from the host device 50.

In Step S32, in response to the second NS management command, the memory controller 110 establishes the NS NS #2 adopting the second LBA format.

In Step S33, the memory controller 110 receives a second NS attachment command from the host device 50.

In Step S34, in response to the second NS attachment command, the memory controller 110 establishes an L2P table L2P #2 (which may be another example of the L2P table 120T) in order to manage access of the NS NS #2.

In Step S35, the memory controller 110 performs one or more access operations such as a write operation and a read operation. According to this embodiment, in response to a second write command from the host device 50, the memory controller 110 may write second data into the NS NS #2 (e.g. a logical address LBA #(x2) therein), and correspondingly update the L2P table L2P #2 to indicate a mapping relationship between at least one logical address (e.g. the logical address LBA #(x2)) and the second data. In response to a second read command from the host device 50, the memory controller 110 may read the second data from the NS NS #2 according to the L2P table L2P #2 (e.g. the mapping relationship therein). Step S35 is a non-essential step.

In addition, the memory controller 110 may integrate the L2P tables L2P #1 and L2P #2 into a global L2P table GL2P, so that the global L2P table GL2P may comprise contents of the L2P tables L2P #1 and L2P #2.

For better comprehension, the method may be illustrated by the working flow 200 shown in FIG. 2, but the present invention is not limited thereto. According to some embodiments, one or more steps in the working flow 200 may be added, deleted or changed.

Figure 3:
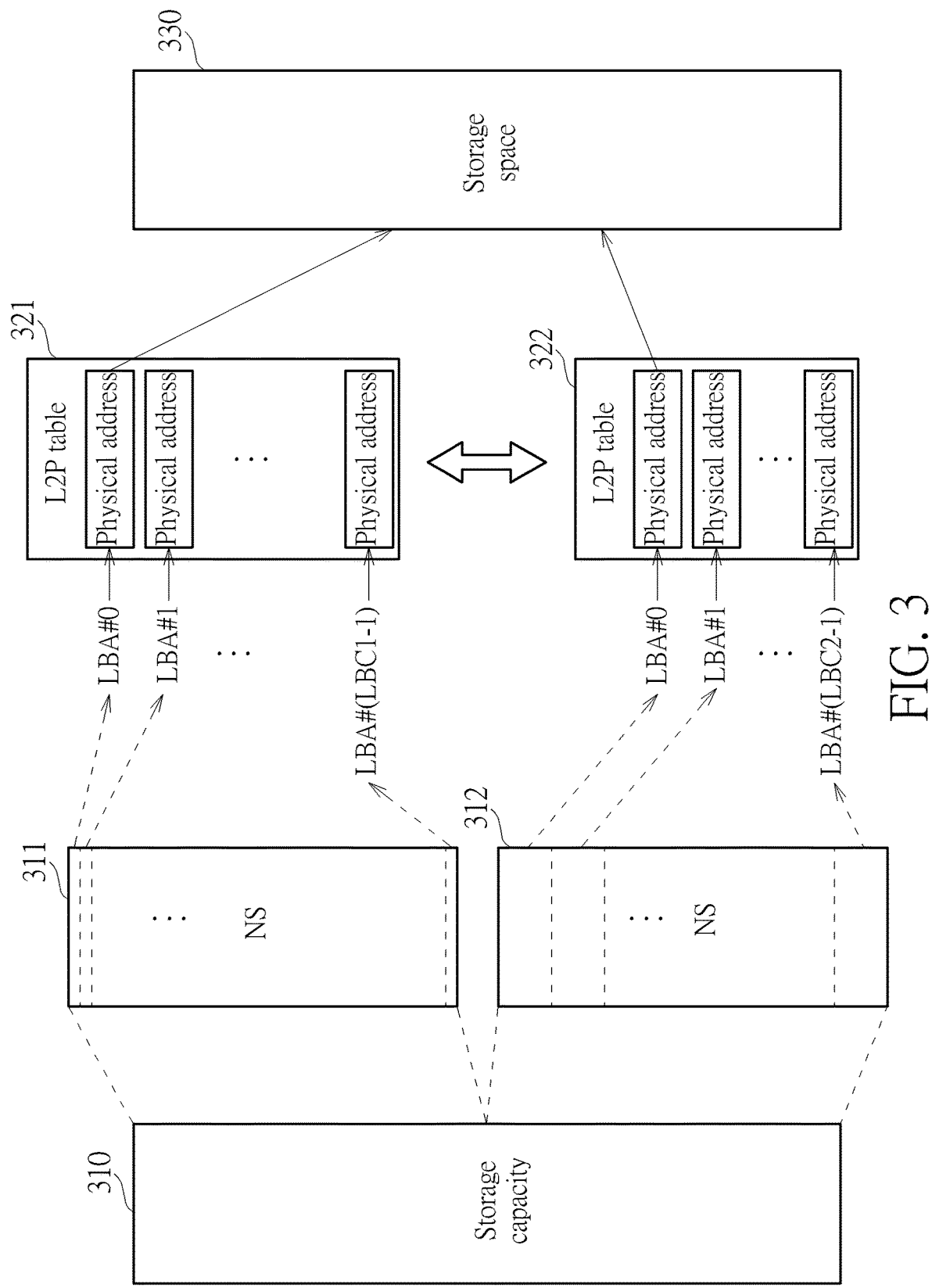
FIG. 3 illustrates a management scheme of the method shown in FIG. 2 according to an embodiment of the present invention.

FIG. 3 illustrates a management scheme of the method shown in FIG. 2 according to an embodiment of the present invention, where NSs 311 and 312 may respectively be examples of the NSs NS #1 and NS #2, and the L2P tables 321 and 322 may respectively be examples of the L2P tables L2P #1 and L2P #2. Assume that the storage capacity 310 of the NV memory 120 is 512 Giga-Byte (GB), and the NSs 311 and 312 have the same storage capacity and each of them has 256 GB. A number LBC1 of first logical blocks within the NS 311 is equal to a first predetermined number (e.g. 512 mega (M)), and a size of each first logical block within the first logical blocks is equal to a first predetermined size (e.g. 0.5 KB), where a product of the first predetermined size and the first predetermined number is equal to the storage capacity of the NS 311. In addition, a number LBC2 of second logical blocks within the NS 312 is equal to a second predetermined number (e.g. 64 M), and a size of each second logical block within the second logical blocks is equal to a second predetermined size (e.g. 4 KB), where a product of the second predetermined size and the second predetermined number is equal to the storage capacity of the NS 312.

As mentioned above, under a condition of the same storage capacity, a size of a logical block is inversely proportional to a number of logical blocks. For example, the size of the logical block changes to 4 KB from 0.5 KB, which is an increase of 8 times the original size, and the number of the logical blocks changes to 64 M from 512 M, which is a reduction to an ⅛ of the original number.

In addition, the memory controller 110 may utilize a predetermined data amount (e.g. 0.5 KB) to be a default value of a data access amount, and record a multiple value to represent a size of the logical block of each configuration. For example, the size of the logical block of the first configuration is 0.5 KB, so that the multiple value is 1; the size of the logical block of the second configuration is 4 KB, so that the multiple value is 8. When the memory controller 110 accesses the NV memory 120, the memory controller 110 may determine the data access amount for access to the NV memory 120 according to the default value and the multiple value.

As shown in FIG. 3, the NS 311 and 312 have the same storage capacity, and each NS within the NSs 311 and 312 occupies a half of the storage space 330 within the NV memory 120. After the NS 311 is established, the logical address LBA #(x1) may be any of corresponding logical addresses {LBA #0, LBA #1, . . . LBA #(LBC1−1)}. The memory controller 110 may store data, which is assigned to be stored into the logical address LBA #(x1) by the host device 50, into a certain physical address within the NV memory 120, and store a mapping relationship between the logical address LBA #(x1) and this physical address into the L2P table 321. The logical address LBA #0 may be an example of the logical address LBA #(x1). This physical address can store a data amount equal to or greater than the first predetermined size.

In addition, after the NS 312 is established, the logical address LBA # (x2) may be any of corresponding logical addresses {LBA #0, LBA #1, . . . , LBA #(LBC2−1)}. The memory controller 110 may store data, which is assigned to be stored into the logical address LBA #(x2) by the host device 50, into a certain physical address within the NV memory 120, and store a mapping relationship between the logical address LBA #(x2) and this physical address into the L2P table 322. The logical address LBA #0 may be an example of the logical address LBA #(x2). This physical address can store a data amount equal to or greater than the second predetermined size.

Figure 4:
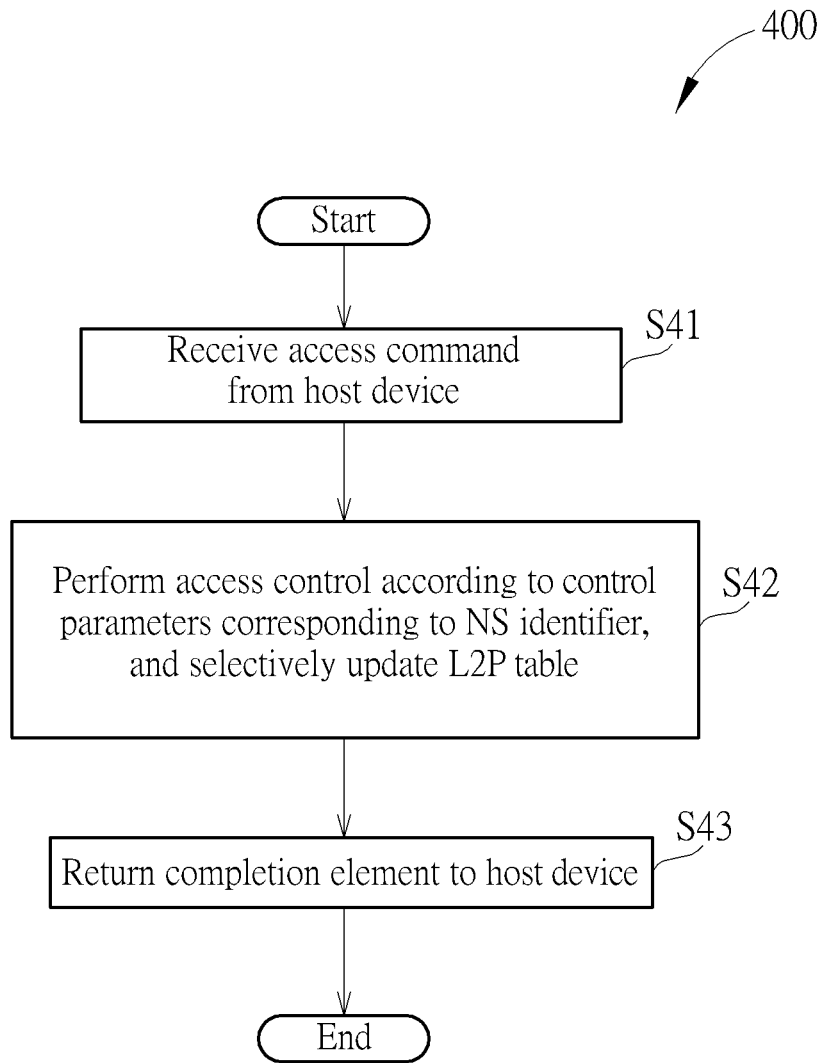
FIG. 4 is a diagram illustrating a working flow related to access control of the method shown in FIG. 2 according to an embodiment of the present invention.

FIG. 4 is a diagram illustrating a working flow 400 related to access control of the method shown in FIG. 2 according to an embodiment of the present invention. For example, under control of the processing circuit such as the microprocessor 112, the controller such as the memory controller 110 may perform operations of the working flow 400.

In Step S41, the memory controller 110 receives an access command from the host device 50. For example, the access command may be a first write command for accessing the NS 311 or a second write command for accessing the NS 312. In another example, the access command may be a first read command for accessing the NS 311 or a second read command for accessing the NS 312.

In Step S42, the memory controller 110 performs access control according to control parameters corresponding to an NS identifier NSID, and selectively updates an L2P table L2P #(y) such as the L2P table L2P #1 or L2P #2.

According to this embodiment, under a condition where the NS identifier is equal to an identifier NS #1 (indicated in italics for better comprehension) of the NS NS #1, the L2P table L2P # (y) represents the L2P table L2P #1, and the control parameters may be respectively equal to a set of first predetermined parameters (e.g. a set of first default parameters). Under a condition where the NS identifier is equal to an identifier NS #2 (indicated in italics for better comprehension) of the NS NS #2, the L2P table L2P #(y) represents the L2P table L2P #2, and the control parameters may be respectively equal to a set of second predetermined parameters (e.g. a set of second default parameters). In addition, when the access command is a write command (such as the first write command or the second write command), after the memory controller 110 writes user data within the write command into the NV memory 120 or after the memory controller 110 writes the user data into the buffer memory 116, the memory controller 110 updates the L2P table L2P #(y). When the access command is a read command (such as the first read command or the second read command), the memory controller 110 does not need to update the L2P table L2P #(y).

In Step S43, the memory controller 110 returns a completion element to the host device 50, where the completion element may be completion information conforming to the NVME specification. According to this embodiment, the write command (such as the first write command or the second write command) may be a data write command conforming to the NVME protocol, and the read command (such as the first read command or the second read command) may be a data read command conforming to the NVME protocol. After finishing executing the data write command or the data read command conforming to the NVME protocol, the memory controller 110 may write the completion element conforming to the NVME protocol into the host device 50, but the present invention is not limited thereto.

For better comprehension, related operations of the access control of the method may be illustrated by the working flow 400 shown in FIG. 4, but the present invention is not limited thereto. According to some embodiments, one or more steps in the working flow 400 may be added, deleted or changed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing storage space management, the method being applied to a data storage device, the data storage device comprising a non-volatile (NV) memory, the NV memory comprising at least one NV memory element, the method comprising:

in an initial phase, receiving an identify controller command from a host device;

in the initial phase, in response to the identify controller command, returning a reply to the host device, to indicate that a plurality of logical block address (LBA) formats are supported, wherein the plurality of LBA formats comprise a first LBA format and a second LBA format;

in a current phase corresponding to a set of predetermined parameters, receiving a first namespace (NS) management command from the host device; and in the current phase, in response to the first NS management command, establishing a first NS adopting the first LBA format, rather than a second NS adopting the second LBA format, wherein the second NS adopting the second LBA format is arranged to be established in response to a second NS management command received from the host device in another phase corresponding to another set of predetermined parameters.

2. The method of claim 1, further comprising:
receiving a first NS attachment command from the host device; and
in response to the first NS attachment command, establishing a first logical-to-physical address mapping table rather than a second logical-to-physical address mapping table, in order to manage access of the first NS, wherein the second logical-to-physical address mapping table is arranged to be established in response to a second NS attachment command received from the host device in order to manage access of the second NS.

3. The method of claim 2, further comprising:
in response to a first write command from the host device, writing first data into the first NS, and correspondingly updating the first logical-to-physical address mapping table.

4. The method of claim 3, further comprising:
in response to a first read command from the host device, reading the first data from the first NS according to the first logical-to-physical address mapping table.

5. The method of claim 1, wherein the first NS and the second NS have a same storage capacity.

6. The method of claim 5, wherein a number of first logical blocks within the first NS is equal to a first predetermined number, a size of each first logical block within the first logical blocks is equal to a first predetermined size, and a product of the first predetermined size and the first predetermined number is equal to said same storage capacity.

7. The method of claim 6, wherein a number of second logical blocks within the second NS is equal to a second predetermined number, a size of each second logical block within the second logical blocks is equal to a second predetermined size, and a product of the second predetermined size and the second predetermined number is equal to said same storage capacity.

8. The method of claim 1, wherein a number of first logical blocks within the first NS is equal to a first predetermined number, and a size of each first logical block within the first logical blocks is equal to a first predetermined size.

9. The method of claim 8, wherein a number of second logical blocks within the second NS is equal to a second predetermined number, and a size of each second logical block within the second logical blocks is equal to a second predetermined size; and a product of the first predetermined size and the first predetermined number is equal to a product of the second predetermined size and the second predetermined number.

10. The method of claim 1, further comprising:
utilizing a predetermined data amount to be a default value of a data access amount, and recording a multiple value; and
determining the data access amount for accessing the NV memory according to the default value and the multiple value.

11. A data storage device, comprising:
a non-volatile (NV) memory, arranged to store information, wherein the NV memory comprises at least one NV memory element; and
a controller, coupled to the NV memory, arranged to control operations of the data storage device, wherein the controller comprises:
a processing circuit, arranged to control the controller according to a plurality of host commands from a host device, to allow the host device to access the NV memory through the controller, wherein:
in an initial phase, the controller receives an identify controller command from the host device;
in the initial phase, in response to the identify controller command, the controller returns a reply to the host device, to indicate that a plurality of logical block address (LBA) formats are supported, wherein the plurality of LBA formats comprise a first LBA format and a second LBA format;
in a current phase corresponding to a set of predetermined parameters, the controller receives a first namespace (NS) management command from the host device; and
in the current phase, in response to the first NS management command, the controller establishes a first NS adopting the first LBA format, rather than a second NS adopting the second LBA format, wherein the second NS adopting the second LBA format is arranged to be established in response to a second NS management command received from the host device in another phase corresponding to another set of predetermined parameters.

12. The data storage device of claim 11, wherein the controller receives a first NS attachment command from the host device; and in response to the first NS attachment command, the controller establishes a first logical-to-physical address mapping table rather than a second logical-to-physical address mapping table, in order to manage access of the first NS, wherein the second logical-to-physical address mapping table is arranged to be established in response to a second NS attachment command received from the host device in order to manage access of the second NS.

13. The data storage device of claim 12, wherein in response to a first write command from the host device, the controller writes first data into the first NS, and correspondingly updates the first logical-to-physical address mapping table.

14. The data storage device of claim 13, wherein in response to a first read command from the host device, the controller reads the first data from the first NS according to the first logical-to-physical address mapping table.

15. The data storage device of claim 11, wherein the first NS and the second NS have a same storage capacity.

16. A controller of a data storage device, the data storage device comprising the controller and a non-volatile (NV) memory, the NV memory comprising at least one NV memory element, the controller comprising:
a processing circuit, arranged to control the controller according to a plurality of host commands from a host device, to allow the host device to access the NV memory through the controller, wherein:
in an initial phase, the controller receives an identify controller command from the host device;
in the initial phase, in response to the identify controller command, the controller returns a reply to the host device, to indicate that a plurality of logical block address (LBA) formats are supported, wherein the plurality of LBA formats comprise a first LBA format and a second LBA format;

in a current phase corresponding to a set of predetermined parameters, the controller receives a first namespace (NS) management command from the host device; and in the current phase, in response to the first NS management command, the controller establishes a first NS adopting the first LBA format, rather than a second NS adopting the second LBA format, wherein the second NS adopting the second LBA format is arranged to be established in response to a second NS management command received from the host device in another phase corresponding to another set of predetermined parameters.

17. The controller of claim 16, wherein the controller receives a first NS attachment command from the host device; and in response to the first NS attachment command, the controller establishes a first logical-to-physical address mapping table rather than a second logical-to-physical address mapping table, in order to manage access of the first NS, wherein the second logical-to-physical address mapping table is arranged to be established in response to a second NS attachment command received from the host device in order to manage access of the second NS.

18. The controller of claim 17, wherein in response to a first write command from the host device, the controller writes first data into the first NS, and correspondingly updates the first logical-to-physical address mapping table.

19. The controller of claim 18, wherein in response to a first read command from the host device, the controller reads the first data from the first NS according to the first logical-to-physical address mapping table.

20. The controller of claim 16, wherein the first NS and the second NS have a same storage capacity.

* * * * *